Oct. 7, 1952  W. P. GALLAGHER ET AL  2,612,975
COIN CONTROLLED METER AND BANK THEREFOR
Filed Aug. 26, 1950  6 Sheets-Sheet 1

INVENTORS
William P. Gallagher
Anthony Daniel Stolle
Donald E. Schroeder
BY Brown, Jackson, Boettcher & Dienner.
ATTORNEYS Oct. 7, 1952 W. P. GALLAGHER ET AL 2,612,975
COIN CONTROLLED METER AND BANK THEREFOR
Filed Aug. 26, 1950 6 Sheets-Sheet 5

INVENTORS
William P. Gallagher
Anthony Daniel Stolle
Donald E. Schroeder
BY Brown, Jackson, Boettcher & Diemer
ATTORNEYS Oct. 7, 1952  W. P. GALLAGHER ET AL  2,612,975
COIN CONTROLLED METER AND BANK THEREFOR
Filed Aug. 26, 1950  6 Sheets-Sheet 6

Inventors:—
William P. Gallagher,
Anthony Daniel Stolle,
Donald E. Schroeder,
By Brown, Jackson, Boettcher & Dienner
Atty's.

Patented Oct. 7, 1952

2,612,975

UNITED STATES PATENT OFFICE 2,612,975

COIN CONTROLLED METER AND BANK THEREFOR

William P. Gallagher, River Forest, and Anthony Daniel Stolle and Donald E. Schroeder, Chicago, Ill., assignors to International Register Company, Chicago, Ill., a corporation of Illinois Application August 26, 1950, Serial No. 181,618

13 Claims. (Cl. 194—9)

This invention relates to meters for use in selling, on the time payment plan, electrical home appliances paid for by insertion into the meter of coins of proper value, each coin advancing the meter a predetermined paid for period of time, and has to do with meters of the character stated provided with coin receiving receptacles or banks.

Coin meters of the character above stated are extensively used in the sale of electric refrigerators and various other home appliances. The usual practice is for a collector to call at the residences of the purchasers of appliances and remove the inserted coins from the meters, crediting the respective purchasers with the amount of such coins. In that connection, the meter is locked against removal therefrom of inserted coins and the purchaser of the appliance does not have a key to the meter, which key is kept in the possession of the seller of the appliance, or dealer, and his collectors, as will be understood. The necessity of employing collectors incurs substantial additional expense in connection with the sale of the appliances, which is objectionable for obvious reasons. Also, it frequently happens that when the collector calls the purchaser is not at home, which causes further expense and delay. A further objection is that the purchaser of the appliance does not have an incentive to visit the establishment of the seller or dealer who, if the purchaser had such an incentive, might make further sales to such purchaser.

Our invention is directed to the provision of a coin meter of the character referred to having a coin receptacle or bank which may be removed from the meter by the purchaser and delivered to the dealer, to be opened by the latter for crediting to the account of the purchaser the amount of the coins therein. We provide a bank which is positioned in the meter for reception of the inserted coins, the bank and the meter having cooperating means effective for preventing advancement of the meter by insertion of a coin when the bank has been removed from the meter, while enabling the meter for advancement thereof by insertion of coins when the bank is in position therein. Lock means is provided for locking the bank in the meter and for locking the bank itself against removal of coins therefrom. The lock means is operated by two keys, one of which remains in possession of the purchaser and is effective for locking the bank in the meter and releasing it for removal therefrom, but is ineffective for unlocking the bank itself for removal of coins from the latter. The other key remains in the possession of the dealer and is effective for locking the bank and unlocking it, for removal of the coins contained therein. The purchaser removes the bank from the meter at convenient times and delivers it to the dealer. The latter unlocks the bank, credits the amount of the coins therein to the account of the purchaser, and then locks the bank and returns it to the purchaser. Remover of the bank from the meter disables the latter so that it can not be advanced by insertion of a coin, thereby guarding against a dishonest purchaser advancing the meter, by repeatedly inserting the same coin, a plurality of time periods not paid for. The purchaser inserts the emptied bank into the meter and locks it therein, thereby enabling the meter so that, so long as the bank remains in place, it is advanced a time period for each coin inserted. In that manner necessity for collectors is avoided and the corresponding expense is eliminated and the purchaser is induced to come into the dealer's establishment at reasonably frequent intervals, with the possibility of further sales to the purchaser. Further objects and advantages of our invention will appear from the detail description.

The mechanism of the meter is, in general, similar to that disclosed in Patent No. 2,147,937, issued February 21, 1939, to Ernest H. Thompson.

The mechanism of the meter is disposed within a suitable casing 1, the front of which is normally closed by a hingedly mounted door 2 provided with a window 3 for observation of the dial of the meter mechanism, as will be explained. The door is further provided with a key operated cylinder lock 4 of known type having an element disposed to engage in back of the forward arm 5a of a U-shaped bracket 5 spot-welded or otherwise suitably secured to one side wall of the casing. Inner arm 5b of bracket 5 projects inwardly of casing 1 beyond arm 5a, and a bracket 6 is secured to the inner face of the other side wall of the casing. A supporting plate 7 fits within casing 1 and seats upon bracket 6 and arm 5b of bracket 5, this plate being secured to the brackets by screws 8, or in any other suitable manner. The lower portion of plate 7 is cut away to accommodate a partition plate 9 of approximately L-shape in front view, this plate 9 defining, with the adjacent portions of the bottom and side walls of the casing, a compartment for a bank which receives the coins inserted into the meter, as will be later described.

A clockwork assembly 10 is suitably mounted on plate 7 at the back thereof. This assembly comprises a self-starting synchronous motor 11 of known type, which, through a gear train 12, drives a pinion 13 at constant speed. This pinion projects through an opening in plate 7, and the front of the pinion is flush with the front face of a gear 15 with which the pinion meshes. Gear 15 is rotatably mounted on a stub shaft 16 secured in plate 7, and is disposed in front of a switch control lever 17 mounted for free turning movement on the stub shaft and confined between plate 7 and a slotted lock member 18 of known type which engages into a circumferential groove in the stub shaft. A gear 19 is secured on gear 15, at the front of the latter gear. Gear 19 meshes with a gear 21 rotatably mounted on a pin 22 carried by lever 17 and disposed remote from stub shaft 16. A pinion 23, secured to gear 21 at the front face thereof, meshes with a relatively large gear 24, rotatably mounted on stub shaft 16 in front of gears 15 and 19. Gear 21 and pinion 23 are driven in a counterclockwise direction, pinion 23 normally driving gear 24 in a clockwise direction, as viewed in Figure 3.

Gear 24 is provided with a forwardly extending hub 25 on which is rotatably mounted a hub 26 upon which is secured a toothed wheel 27. A suitably graduated dial 28 is secured on the outer end of hub 26, and a pointer 29 is secured on the outer end of hub 25 of gear 24, in front of and closely adjacent the outer end of hub 26, hubs 25 and 26 being thus held against appreciable relative endwise movement. A retaining member, conveniently a screw 30, is secured in the outer end of stub shaft 16 and overlies the forward end of hub 25, normally holding the latter against movement lengthwise of stub shaft 16 toward the forward or outer end thereof. The gear 24 and wheel 27 and associated parts constituet a setting and controlling assembly normally held upon the stub shaft 16 by screw 30, which assembly can be removed from the stub shaft endwise thereof upon removal of the screw. Normally, gear 24 overlies gear 21, as in Figure 3, and prevents outward movement of the latter on pin 22 while also preventing movement of gears 15 and 19 lengthwise of stub shaft 16 toward the outer or forward end of the latter. By removing the setting and controlling assembly from stub shaft 16, ready access is had to gears 21 and 19 and 15, which may then be removed and replaced with facility. In order to vary the timing of the mechanism, the unit comprising gears 15 and 19, and the unit comprising gear 21 and pinion 23, may be replaced by similar units in which the ratio between gears 19 and 21 is different from the ratio between these gears of the replaced units and of proper value to give the desired timing of the mechanism. After this adjustment has been effected, the controlling and setting assembly is replaced upon stub shaft 16. This provides extremely simple means for adjusting the timing of the mechanism to suit requirements.

Lever 17 is provided, adjacent its free end, with a tongue 31, struck rearwardly therefrom and projecting into an opening 32 in plate 7 (Figure 7), this tongue cooperating with the bottom edge of opening 32 for limiting turning movement of the lever 17 in clockwise direction on stub shaft 16. A tongue 31a is struck forwardly from plate 7 and projects over lever 17 for guiding it. Normally, the lever 17 is held in its extreme position in a clockwise direction about the stub shaft which is its operative position, with tongue 31 in contact with the lower edge of opening 32, by a tension spring 33, the upper end of which is hooked through a tab 34 extending downward from the outer end of lever 17, the lower end of this spring being hooked through a tab 35 struck from plate 7 and projecting forwardly thereof. Lever 17 is further provided with an arm 36 extending therefrom at an inclination downward and away from the outer end of the lever, the lower end of this arm being shaped to provide an upwardly projecting latch element 37. Arm 36 extends between plate 7 and a forwardly offset guide plate 38 mounted on plate 7 and providing therewith a pocket for reception of an element of a setting pawl, hereinafter described in detail.

A setting lever 39, of substantially L-shape is secured upon the reduced rearward end of a sleeve 40, mounted for turning movement on a post 41 secured in plate 7 below arm 36 of lever 17. A timer setting pawl 43 is mounted for turning movement on post 41 and is confined between the forward end of sleeve 40 and a washer 44 confined between pawl 43 and a lock member 45 of known type engaging into a circumferential groove 46 in the post. Setting pawl 43 is provided, at the end thereof adjacent gear 21, with two tabs 47 which project forward from the pawl and converge toward wheel 27, these tabs defining a tooth element adapted for engagement between the teeth of the wheel. Pawl 43 is further provided, at its other end, with a forwardly projecting tab 48 disposed to contact the following edges of the teeth of wheel 27, and cooperating with the tooth defined by tabs 47 for imparting clockwise rotation to wheel 27 in the operation of setting the mechanism for a predetermined time period of operation. Pawl 43 is provided with a stop finger 50 disposed to contact the lower face of a tab 51 projecting forwardly from lever 39 at the upper edge thereof. The central part of tab 51 is struck upwardly to provide a stud 52 which extends into the lower end of a compression coil spring 53, confined between tab 51 and a tab 54 projecting rearwardly from the timer setting pawl 43 at the lower edge thereof. The central portion of tab 54 is struck downward to provide a stud 55 which extends into the upper end portion of spring 53. A tension spring 56 is attached at its upper end to a rearwardly extending tab 56a of a latch pawl 150, to be described later, and has its lower end hooked through a tab 57 projecting forwardly from lever 39 at the lower edge thereof. This tension spring normally holds lever 39 in such position that tab 51 thereof contacts the upper edge of finger 50 of the timer setting pawl 43, and retains the latter in such position that the tooth element defined by tabs 47 engages between two adjacent teeth of toothed wheel 27 and locks the latter against rotation in either direction.

Wheel 27 is provided with a tongue 60 struck therefrom and projecting rearwardly therefrom. This tongue 60 is disposed in advance of, and in the path of travel of, a tongue 61 struck from and projecting forwardly from gear 24, this latter tongue 61 traveling clockwise with the gear 24 when the latter is driven. By operation of the timer setting pawl 43, wheel 27 is rotated step by step in a clockwise direction so as to advance tongue 60 relative to tongue 61, thus predetermining the time period of operation of the mechanism controlled by the meter. Dial 28 turns with wheel 27 so as to move a suitably graduated scale 62 on the front face of the dial beneath pointer 29. Each graduation of this scale corresponds to the rotary movement of wheel 27 during one actuation of the pawl 43, due to insertion of a coin, so that the pointer and scale indicate the number of coins which have been inserted and also provide means for determining the period of time for which the mechanism can operate before it becomes necessary to insert additional coins, that is, the remaining period of time during which the controlled mechanism is capable of being operated. By altering the ratio of the timing gears 19 and 21, in the manner previously described, the timing mechanism can be varied to suit payments of from 15¢ per day to $2.00 per day. Assuming that the mechanism is adjusted for payments at the rate of 25¢ every twenty-four hours, the meter being intended for reception of 25¢ pieces or quarters, when a quarter is inserted and the pawl 43 is operated, wheel 27 will be rotated through a distance equal to one space on the scale 62. In this case, the number of spaces on the scale indicated by the pointer 29, in addition to indicating the number of coins inserted or payments made, will also indicate in days the remaining time during which the controlled mechanism is capable of operation. On the other hand, if the mechanism is adjusted for a payment of 25¢ every three hours, the spaces on the scale 62 beyond the pointer 29, in a clockwise direction, will indicate the number of coins inserted and, if multiplied by three, will indicate the remaining number of hours for which the controlled mechanism is capable of operation. A bowed leaf spring 65, disposed about hubs 25 and 26, is confined under compression between gear 24 and wheel 27. This spring serves to prevent any objectionable endwise play between the parts of the controlling and setting mechanism, and also provides friction means for retarding rotation of wheel 27 so as to assure proper movement thereof in accordance with the operation of the timer setting pawl 43.

An arm 67 is pivotally mounted on a stud 68 secured in plate 7 and projecting forwardly therefrom adjacent ratchet wheel 27 and at the opposite side thereof from stud 41. Stud 68 passes through arm 67 and through a tab 69 parallel with arm 67 projecting from the forward edge of a base plate 70 integral with the outer end of the arm. A T-shaped finger 71 projects from the upper end of plate 70 oppositely to arm 67. A pin 72 is secured through the lower end of plate 70 and extends loosely through an opening in member 74 of a movable switch arm 75. Member 74 is conveniently formed of strip metal and has its upper end slotted and loosely inserted beneath the head of the T element 71 to permit of relative rocking movement between member 74 and finger 71. A compression coil spring 76 is disposed about pin 72 and confined between the outer face of member 74 and an abutment member 78 of known type, in the form of a slotted locking member which engages into a circumferential groove in the pin. Arm 75 comprises a fiber strip 79, through which pin 72 passes, slotted at its upper end and there engaging about finger 79, which strip 79 is clamped between plate 70 and member 74. A bridging contact member 80 is suitably mounted on the lower end of strip 79 for limited rocking movement on an axis extending transversely thereof. The contact member 80 carries two contact points 81 disposed for contact with points 82 of cooperating contact members 83 and 84, when the switch arm is in switch closing position. Members 83 and 84 are mounted on a supporting plate 85 of insulating material suitably secured to plate 7 and projecting downward therefrom. Binding posts 86 and 87 are suitably secured to the contact members 83 and 84, respectively, and project rearwardly from the supporting plate 85.

A suitable electrical connecting device 85a, in the form of a plug socket of known type, is mounted in a suitable manner at the back of the insulating supporting plate 85. An electrical cord or cable 88 extends into casing 1 through a suitable opening in the side wall thereof adjacent socket 85a. This cord contains two wires 90 and 91 which may be connected into the local or house circuit in a suitable manner, as by means of a plug cap of known type cooperating with a plug socket member of the same general type as member 85a. The motor 11, for driving the gear train 12 and the timing mechanism, is, as previously noted, of known type and includes a field winding or coil 95. The member 85a cooperates with a plug cap 96 (Figure 9) having prongs 97 for insertion into member 85a for engagement with the contacts therein in a known manner. The cap member 96 is attached to one end of a cord 98 which extends into casing 1 through the same side thereof as cord 88 and may be secured by a suitable clamp 98a. This provides simple and efficient means for establishing electrical connections between the control switch and a motor M of the controlled mechanism, such as an electrical refrigerator.

Figure 9:
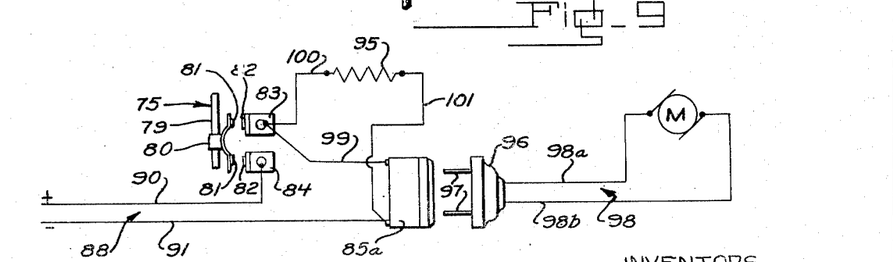
Figure 9 is a circuit diagram of the electrical connections of the meter and the mechanism controlled thereby.
Figure 10:
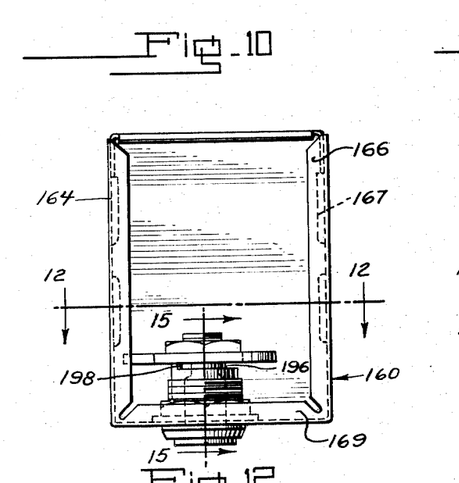
Figure 10 is a plan view of the bank in unlocked condition and with the cover thereof removed.
Figure 11:
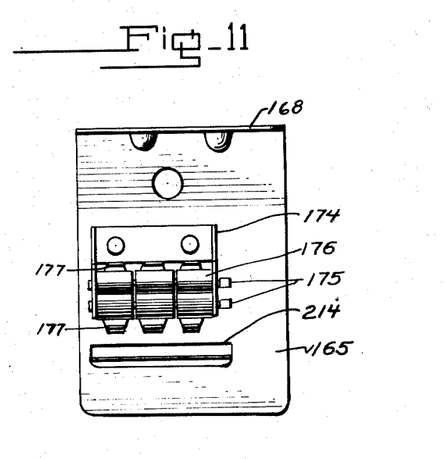
Figure 11 is an underneath view of the bank cover.

In Figure 9 I have shown diagrammatically the connections for the control switch, the field winding of the motor 11, and a motor M, which may be considered as the motor which drives the compressor and associated parts of an electrical refrigerator. Referring to this figure, wire 91 of cord 88 is shown as connected to one terminal of member 85a, the other terminal of which is connected by a lead 99 to contact member 83. Wire 90 of cord 88 is connected to the other contact member 84, one end of winding 95 of motor 11 is connected by lead 100 to contact member 83, and the other terminal of winding 95 is connected by a lead 101 to the terminal of member 85a to which wire 91 is connected. Wires 98a and 98b of cord 98 connect the prongs 97 to the poles of the refrigerator motor M. These connections are effected by attaching wires 99 and 100 to binding post 86, wire 90 being attached to binding post 87, and lead 99 and wire 91 being attached in the usual manner to the terminals of the socket member 85a. It will be seen that, when switch arm 75 is in closed position and the prongs 97 of plug cap 96 are inserted into plug member 85a, the circuit of field winding 95 of motor 11 is closed and this motor is continuously driven, and the circuit of motor M of the controlled mechanism is conditioned for operation of this latter motor, and that the circuits of both motors are opened when the switch arm 75 is in the open position of Figure 9. The field winding of motor 11 is preferably connected in shunt across the circuit of motor M, as shown, and means may be provided for controlling the circuit of motor M supplementary to the main control switch, such as a thermostatic switch, for automatically opening and closing the motor circuit in accordance with variations in temperature, and a manually operated switch for closing and opening the motor circuit as required, which are commonly provided in electrical refrigerators. In all instances, however, the control switch comprising the arm 75 renders the motor M incapable of operation when this switch is opened and capable of operation when the control switch is closed, so that the meter controls the operation of the electrical refrigerator or other controlled mechanism.

Figure 3:
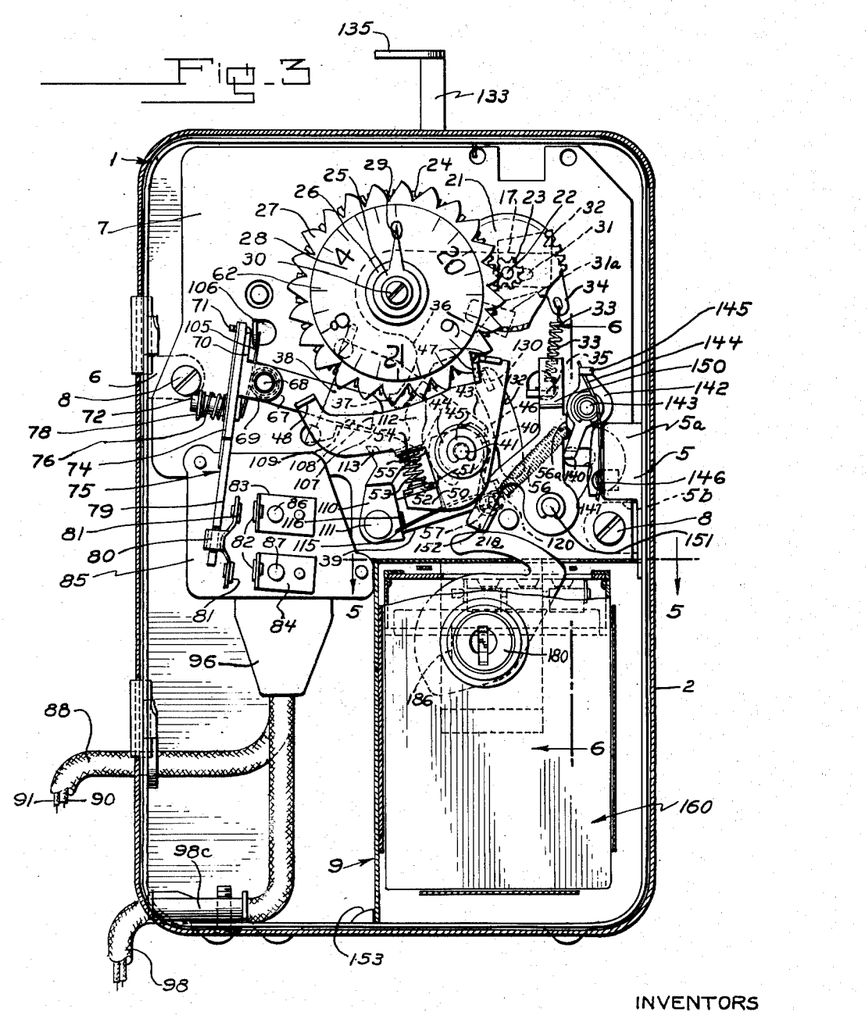
Figure 3 is a sectional view, on an enlarged scale, taken substantially on line 3—3 of Figure 1, the upper portion of the bank being shown in section and the upper arm of the partition member being partly broken away and shown in section in a plane a short distance rearward from the plane of the section line 3—3, with the bank locked in the meter casing.

Switch arm 75 is yieldingly urged into switch opening position by a wire spring 105 coiled about stud 68, one arm of this spring bearing against the inner face of plate 70 adjacent the lower end thereof, and the other arm of this spring bearing against a tab 106 struck from plate 7 and projecting forwardly therefrom. Tab 106 also serves as a stop element for limiting the opening movement of arm 75, as shown in Figure 3.

Arm 67 is provided, at its inner end, with a notch 107 defining a latch element 108 adapted for cooperation with latch element 37 of arm 36 of lever 17, and is further provided, at its lower edge, with a notch forming an inclined edge 109. A switch setting pawl 110 is pivoted at its lower end, at 111, on the inner end of the setting lever 39. This pawl is provided at its upper end, with a relatively long finger 112 and a short finger 113, the latter being disposed to contact edge 109 of arm 67 upon upward movement of pawl 110, when lever 17 is in its normal lowered position. Finger 112 is yieldingly held in contact with the lower edge of arm 36 by a wire spring 115 disposed about tab 57, one arm of which spring contacts the lower edge of a tab 116 projecting forwardly from the outer edge of pawl 110, the other arm of spring 115 engaging about sleeve 40.

Figure 8:
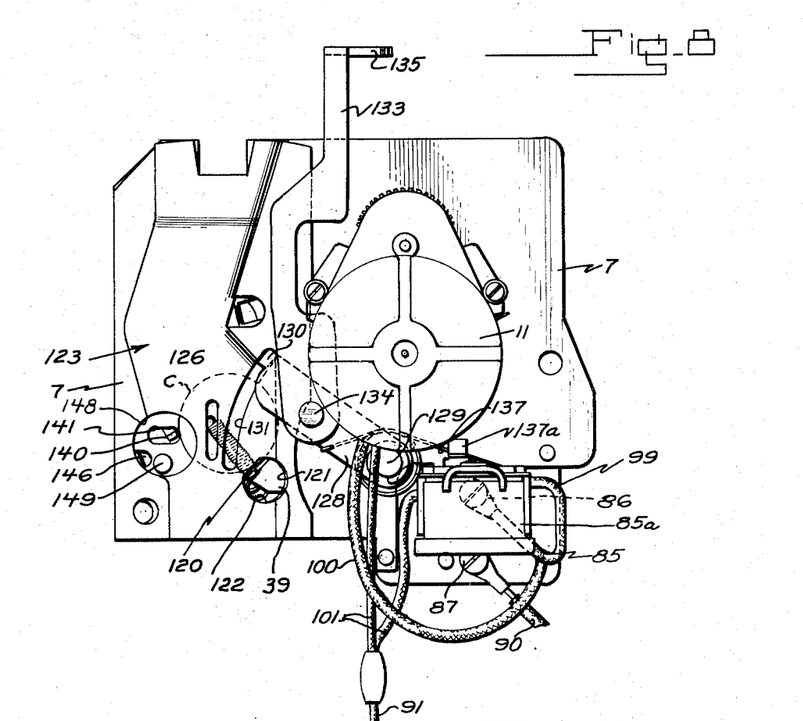
Figure 8 is a back view of the meter mechanism of Figure 7.

Setting lever 39 is provided, at its outer end, with a rearwardly extending tab 120 which projects through an opening 121 in plate 7, and a corresponding opening 122, in a coin chute 123 secured to the back of plate 7 (Figure 8), the tab 120 extending across the chute from front to back thereof so as to intercept a coin passing through the chute. Coin chute 123 is preferably flared at its upper end, as shown, and is disposed in register with slot 124 of a plate 125 (Figure 1) suitably secured to the top wall of casing 1 the top wall of which also has a slot in register with slot 124. The coin chute is of suitable size for reception of 25¢ pieces or quarters, and is provided, intermediate its ends, with an inwardly offset portion 126 disposed to direct a coin c into contact with tab 120. The coin c then rests edgewise upon the tab 120 and upon a tab 140 extending rearward through a slot 141 in plate 7, from the lower end of a coin latch member 142 (Figure 3) pivoted on a stud 143 secured to plate 7 and projecting forwardly therefrom. Latch member 142 is urged clockwise by a torsion spring 144 mounted about stud 143, with an arm engaging a finger 145 projecting forwardly from the upper end of member 142 and its other arm engaging a tab 146 struck forwardly from plate 7. Clockwise movement of coin latch member 142 is limited by contact of tab 140 with plate 7 of the inner end of slot 141. The coin chute 123 is provided with a circular opening 148 exposing the area of plate 7 about slot 141, as shown in Figure 8.

An operating lever 128 (Figure 8) is pivoted at one end, at 129, on the back of supporting plate 7. At its other end lever 128 is provided with a forwardly projecting finger 130 (Figures 6 and 8) which projects through an arcuate slot 131 extending downward and across portion 126 of coin chute 123 and intersecting coin c, this slot 131 being aligned with a similar slot 132 in plate 7. An operating rod or plunger 133 is pivoted at its lower end, at 134, to lever 128. The upper portion of plunger 133 is bent at right angles to provide a pressure applying head or finger 135. Lever 128 is urged in a clockwise direction about its pivot 129, as viewed in Figure 8, by a wire spring 137, one arm of which engages the lower edge of the lever, and the other arm of which contacts a tab 137a struck rearward from plate 7.

In Figure 3, pointer 29 is at the zero position on scale 62, gear 24 is locked against rotation by contact of tongue 61 with tongue 60, and lever 17 has been raised by the planetary action of pinion 23 travelling around gear 24, releasing arm 67 and permitting movement of switch arm 75 into its open position by spring 105.

In order to close the control switch, a coin c (Figure 8) is inserted into the coin chute 123, after which the plunger 133 is depressed, thus swinging the operating lever 128 downward so as to bring plunger 130 into contact with the coin and force the latter downward in the chute. In the first part of its downward movement, the coin c forces the outer end of the setting lever 39 downward a short distance, and also forces tab 140 of the coin latch member 142 outward a short distance, and then contacts a stud 149 projecting rearward from plate 7. Coin c is then held seated against tab 120 of lever 39 and stud 149, by tab 140 which is then disposed a substantial distance above the center of coin c. Continued downward movement of plunger 133 forces the coin downward between stud 149 and tab 120, effective for moving the outer end of the setting lever 39 a further and material distance downward. This downward movement of the outer end of setting lever 39 causes upward movement of the inner end of this lever and turning movement of the setting pawl 43 in a clockwise direction as viewed in Figure 3. In this movement of pawl 43 finger 48 thereof is positioned in advance of one of the teeth of wheel 27 and the tooth defined by tabs 47 of this pawl is then disengaged from the wheel. This permits turning by spring 33 of the setting and controlling assembly a short distance in clockwise direction sufficient to return lever 17 to its normal lowered or operative position.

Finger 113 of pawl 110 then contacts edge 109 of arm 67 so as to move this arm upward and, at about the same time, finger 48 of pawl 43 contacts the following edge of a tooth of ratchet wheel 27 so as to rotate the same a slight distance in a clockwise direction. In the continued upward movement of pawl 110, arm 67 is raised, thus moving the switch arm 75 into switch closing position, and the inner end of arm 67 contacts the lower end of arm 36, swinging lever 17 a short distance in a counterclockwise direction against the tension of spring 33 until latch element 108 of arm 67 passes above latch element 37 of arm 36, at which time lever 17 is again returned to its lowermost position with a snap action by tension spring 33 so as to engage latch element 37 beneath latch element 108, thus locking the switch arm 75 in closed position. If thereafter lever 39 is actuated to move pawl 110 upward, arm 67 may be raised slightly, this being permitted by the loose and resilient connections between arms 67 and 75, previously referred to, but arm 67 is retained in switch closing position so long as lever 17 remains in its lowered position. This closes the circuit of motor 11, setting the meter in operation, and conditions the circuit of motor M for operation.

When the coin c passes beyond tab 120 of lever 39, this lever is returned to its normal position by tension spring 53. In the return movement of the lever 39, the tabs 47 of pawl 43 engage between two adjacent teeth of wheel 27, advancing the wheel the remaining one-half of a space of the scale 62, and then locking wheel 27 against rotation. In this manner, wheel 27 is advanced one full space of the scale upon insertion of a coin. Likewise, wheel 27 is advanced a corresponding distance for the insertion of each additional coin, it being noted that the scale 62 is provided with twenty-two spaces and the mechanism is intended for reception of twenty-two coins inserted one immediately after the other. It is possible, however, to advance the dial a further distance of one space before pin 60 thereof contacts pin 61 of gear 24, after twenty-two coins have been inserted, so that the maximum capacity of the meter, at a single setting thereof, starting at zero, is twenty-three coins.

After closing of the control switch in the manner described, this switch will remain closed for a predetermined period of time, depending upon the number of coins inserted, this number and the time during which the switch will remain closed being indicated by the pointer 29 and scale 62. When the pointer 29 again reaches the zero position on the scale 62, gear 24 will be locked against rotation by contact of finger 61 of this gear with finger 60 of wheel 27, at which time pinion 23 will travel around gear 24 in a counterclockwise direction, thus raising lever 17 and disengaging latch element 37 of arm 36 from latch element 108 of arm 67, releasing the latter arm and permitting of switch arm 75 being moved into open position by spring 105.

It will be noted that rotation of wheel 27, for setting the mechanism for the predetermined time period of operation, is effected solely by the timer setting pawl 43, which contributes to accuray of operation and simplicity of construction. A further desirable feature is the ease with which the timing of the mechanism, to suit various agreed upon payments, can be effected, in the manner above described. The association of the switch closing and latching means with the timing and setting and control mechanism is advantageous as contributing to accuracy of operation and compactness of construction.

We preferably use the meter mechanism herein shown and described in detail, but, within the broader aspects of our invention, any suitable meter mechanism may be used.

Figures 1, 2, 4, 5:
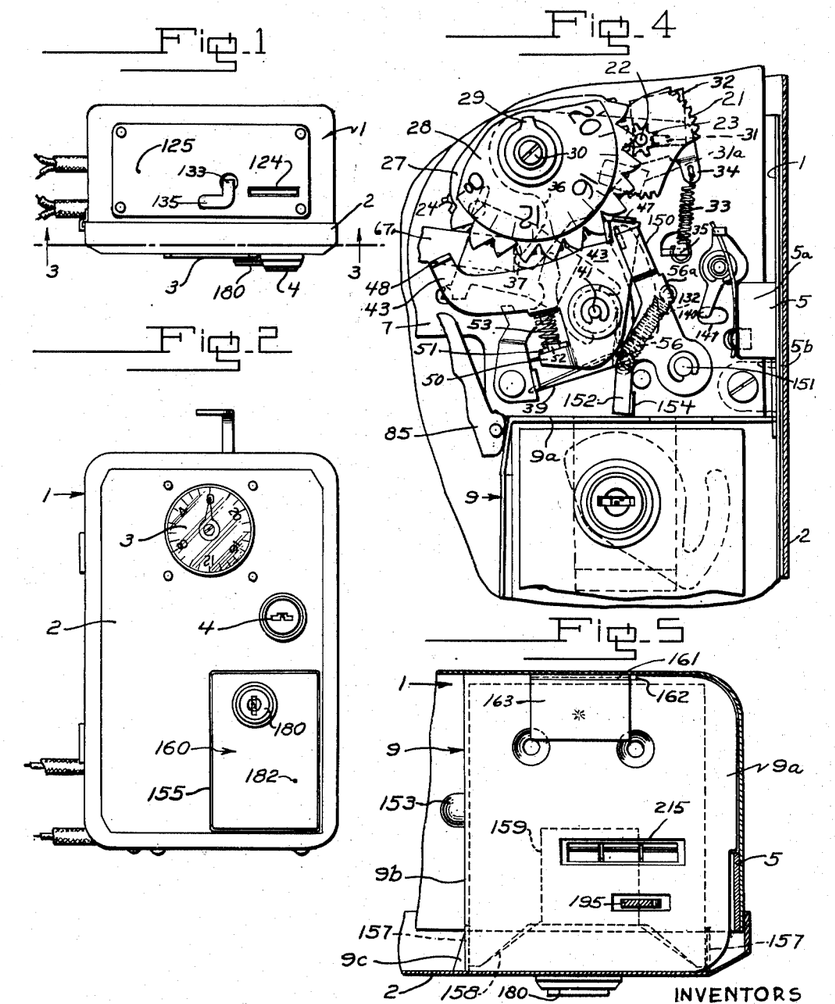
Figure 1 is a plan view of a meter and a bank therefor embodying our invention.
Figure 2 is a front view of the meter and bank of Figure 1.
Figure 4 is a fragmentary view similar to Figure 3, with the bank unlocked from the meter casing for removal therefrom, showing the lower right hand portion of the meter and the upper portion of the bank and associated parts.
Figure 5 is a sectional view taken substantially on line 5—5 of Figure 3.

The latch pawl 150 is pivoted on a stud 151 secured to and projecting forwardly from the mounting plate 7. Turning movement of latch pawl 150 counterclockwise (Figures 3 and 4) is limited by contact of a downwardly extending arm 152 thereof with the upper arm 9a of the L-shaped partition member 9, which partition member is held in position by a boss 153 struck upwardly from the bottom wall of the casing 1, and by the bracket 5, with which the notched outer end of the upper arm 9a of partition member 9 engages, as shown in Figure 5. When the latch pawl 150 is in its position shown in Figure 4, its upper end is disposed in close proximity to the tabs 47 of the setting pawl 43 and prevents effective operation thereof upon insertion of a coin into the meter, it being noted that the compression spring 53 permits operation of the setting lever 39 at such time, by passage of the coin downward through the coin chute. When the latch pawl 150 is in its inoperative position shown in Figure 3, it is clear of the tabs 47 of the setting pawl 43, which may then be actuated by an inserted coin for advancing the meter one space representing a paid for time period, as previously explained. The downwardly extended arm 152 of latch pawl 150 is provided, adjacent its lower end, with a forwardly extending finger 154, for a purpose which will appear presently.

The door 2 of casing 1 is locked closed, as above noted, and the key of lock 4 remains in the position of the dealer. The door 2 is provided with an opening 155 aligned with the compartment defined by the partition member 9 and the adjacent portions of walls of the casing 1. The door 2 is further provided with a top flange 156, shown more clearly in Figure 6, side flanges 157 and a bottom flange 158, shown more clearly in Figure 5, extending inward from the edges of the opening 155. The vertical arm 9b of partition member 9 is flared outward at its forward portion, at 9c, to facilitate entry into the compartment of the flange 157 at the inner side of the opening 155, as will be understood. The lower flange 158 is provided with a tongue 159 projecting therefrom a considerable distance into the compartment defined by the partition member 9 and the associated walls of casing 1. A bank 160 fits snugly through opening 155 of door 2 and extends into the compartment aligned with that opening. This bank 160 is centered in the compartment by the flanges 156, 157 and 158 and rests upon and is supported by the lower flange 158 and the tongue 159 thereof. The bank 160 is urged outward by a leaf spring 161 seating in a notch 162 in the rear of arm 9a of partition member 9. The upper portion of the spring 161 is bent over to provide an extension 163 which seats on and is spot welded to arm 9a. The body portion of spring 161 normally is bent forwardly relative to extension 163 thereof and, when the bank 160 is in position within its compartment spring 161, is displaced rearwardly to its position shown in Figure 6 and is then effective for moving the bank 160 forward so as to project a short distance beyond the door 2, when the bank is unlocked or released from the casing 1 for removal therefrom.

The bank 160 may be of any suitable construction. As shown, it comprises a cubi-form body 164 open at its top, and a closure plate or cover 165 slidable between top side flanges 166 of body 164 and ribs 167 pressed inwardly from the side walls of body 164. Cover 165 is provided, at its rearward end, with a downwardly extending flange 168 which, in the fully closed position of cover 165, seats against a forwardly offset upper portion of the rear wall of body 164. When the cover 165 is fully closed, the forward portion thereof extends beneath the flange 169 projecting rearward a short distance from the upper edge of the front wall of body 164.

Figures 6, 7:
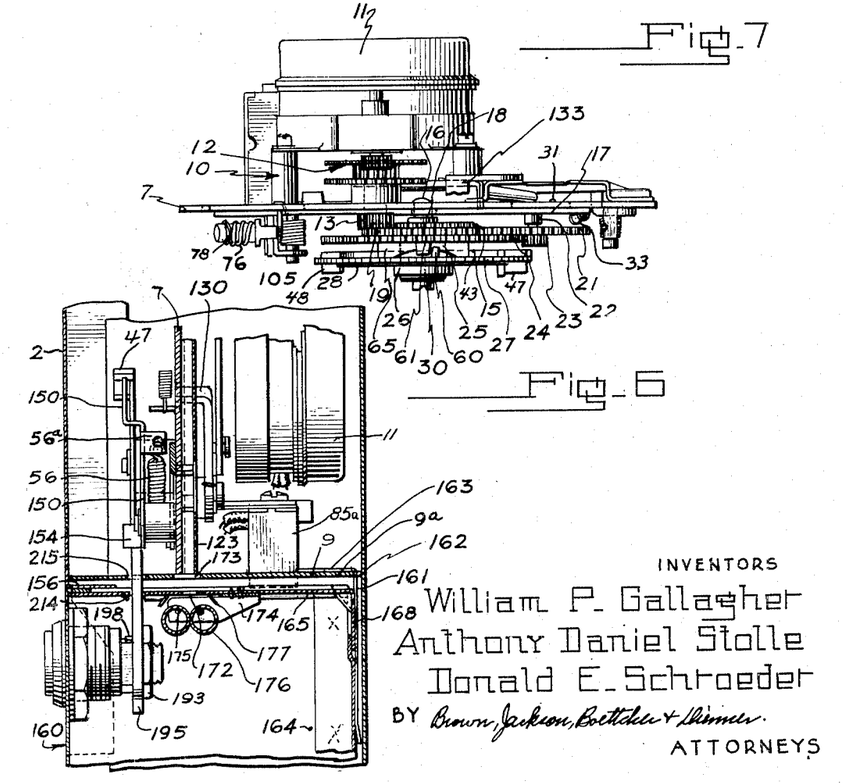
Figure 6 is a sectional view taken substantially on line 6—6 of Figure 3.
Figure 7 is a plan view, on the same scale as Figure 3, of the meter mechanism removed from the casing.

When the bank 160 is fully inserted into its compartment and locked therein, in a manner to be explained presently, with the cover plate 165 in fully closed position upon the body of the bank, a slot 172 in cover 165 is aligned with a slot 173 in arm 9a of partition 9, as shown more clearly in Figure 6, and with the lower end of the coin chute 123. It will be clear, from what has been said, that coins inserted into the meter mechanism and discharged from the lower end of coin chute 23, pass through slots 173 and 172 into the bank 160. In order to guard against unauthorized removal of coins through the slot 172, a bracket 174, of substantially U-shape, is suitably secured, conveniently by riveting, to the under face of cover 165. Two rods 175 are mounted through the arms of bracket 174 in front and in back of slot 172. A plurality of sleeves 176 are loosely mounted on each of the rods 175, these sleeves being disposed between pairs of upwardly converging fingers 177 struck downwardly from cover 165 in front and in back of the slot 172 thereof. When the bank is in position within the meter, the sleeves 176 on one of the rods 175 are in contact with the sleeves on the other rod 175, as shown in Figure 6. These sleeves 176 are then readily displaced by a coin passing downward through slot 172 so as not to in any way interfere with entry of this coin into the bank. If the bank be removed from the meter and inverted in an attempt to remove the coins through slot 172, the sleeves 176 are then held in contact with each other by the fingers 177, effectively preventing removal of coins through slot 172.

We provide lock means for locking the bank 160 in coin receiving position within the meter casing and for locking the bank itself so as to guard against removal of coins therefrom by unauthorized persons, when the bank has been removed from the meter casing. This lock means is operable by two keys, one of which remains in the possession of the purchaser and is effective for releasing the bank for removal thereof from the meter casing but is not effective for unlocking the bank itself, the other key remaining in the possession of the dealer and being effective for unlocking the bank for removal of the coins therefrom and for locking the bank; as and for the reasons above explained.

We have shown, by way of example, one form of lock means suitable for our purposes, but it will be understood that any suitable lock means of a character permitting removal of the bank from the meter by the purchasr while guarding against unlocking of the bank itself by the purchaser, and permitting unlocking and locking of the bank by the dealer, may be used.

Referring to Figures 10 and 12 to 16, inclusive, the bank 160 is provided, at the front thereof with a cylinder lock 180. This lock 180 comprises a barrel or sleeve 181 fitting through an opening in front wall 182 of bank 160, this sleeve having a circumferential flange 183 at its outer end and being secured in position by a nut 184 threading thereon, in cooperation with a spring washer 185 confined between nut 184 and the inner face of wall 182. The sleeve or barrel 181 is provided with a flat 186 which cooperates with a corresponding flat of the opening in wall 182 through which barrel 181 fits, for assuring proper positioning of barrel 181. The barrel 181 is provided interiorly with four equally spaced ribs 187, 188, 189 and 190. The inner faces of these ribs are curved concentrically with the axis of barrel 181. Ribs 187, 189 and 190 extend to the inner end of barrel 181 and rib 188 terminates a considerable distance from the inner end of barrel 181, as shown more clearly in Figures 14 and 15.

Figures 12, 13:
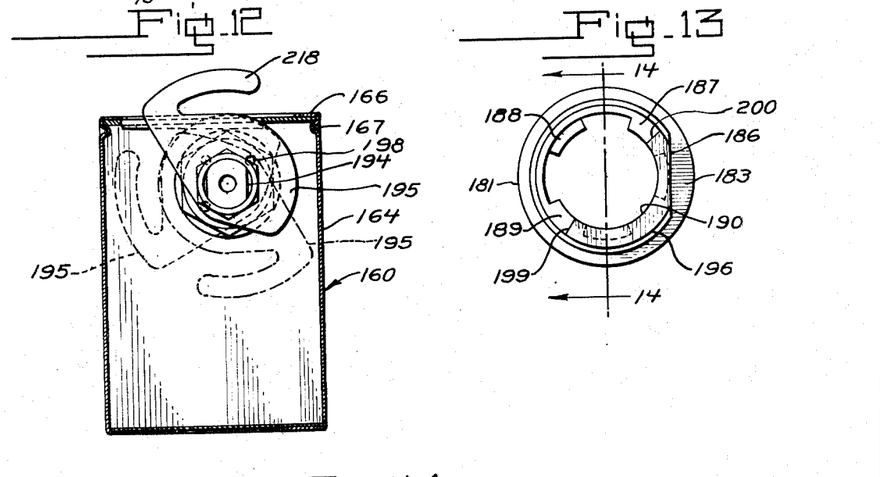
Figure 12 is a sectional view taken substantially on line 12—12 of Figure 10 showing the locking plate of the bank lock in fully locked position in full lines, in bank releasing position in dotted lines, and in fully unlocked position in dot and dash lines.
Figure 13 is an inner end view, on an enlarged scale, of the bank lock mounting sleeve.
Figure 14:
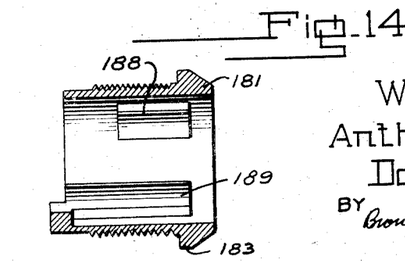
Figure 14 is a sectional view taken substantially on line 14—14 of Figure 13.

The barrel 181 receives therein a cylinder 192 which projects a substantial distance inward beyond the inner end of barrel 181 and is there exteriorly threaded to provide a screw stud 193. The sides of stud 193 are slabbed off to provide flats 194 (Figure 12). A locking plate 195, to be described more fully later, fits snugly on the stud 193 in contact with an arcuate element 196 projecting from the inner end of barrel 181, and is held thereon by a nut 197 threading on stud 193. A pin 198 projects outwardly from the locking plate 195 and is disposed for contact with shoulders 199 and 200 of the arcuate element 196, for limiting turning movement of the locking plate 195 in either direction, as will be clear from what has been said.

The cylinder 192 of lock 180 is provided with a diametrical slot 202 extending from the stud 193 and opening, at its outer end, into a key slot 203 in the head 204 of cylinder 192. Head 204 seats against the outer ends of the ribs 187, 188, 189 and 190 and, in cooperation therewith and with the locking plate 195 restrains cylinder 192 against endwise movement in the barrel 181. The cylinder 192 is also provded with slots 205 opening into the main slot 202 at the sides thereof. Tumblers 206 are slidably mounted in the slots 205 and are urged outward of cylinder 192—upward in Figures 15 and 16—by compression springs (not shown) as is known. When there is no key inserted into the cylinder 192, all of the tumblers 206 are projected and the first three thereof engage between the ribs 187 and 188, effective for locking cylinder 192 against turning movement.

The cylinder is provided with two oppositely directed and relatively offset fingers 207 for engagement in grooves in a key inserted into the cylinder 192 as is known.

Figure 15:
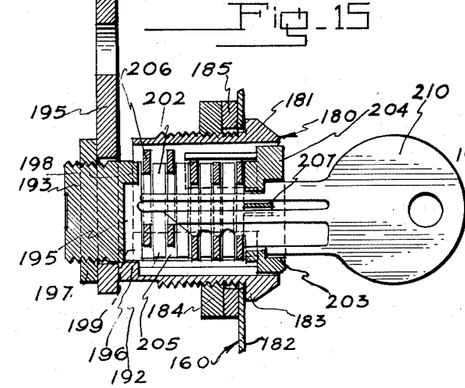
Figure 15 is a sectional view taken substantially on line 15—15 of Figure 10, showing the purchaser's key fully inserted into the lock.
Figure 16:
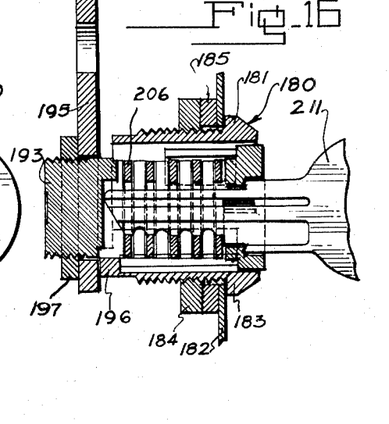
Figure 16 is a view like Figure 15 but showing the dealer's key fully inserted into the lock.
Figure 17:
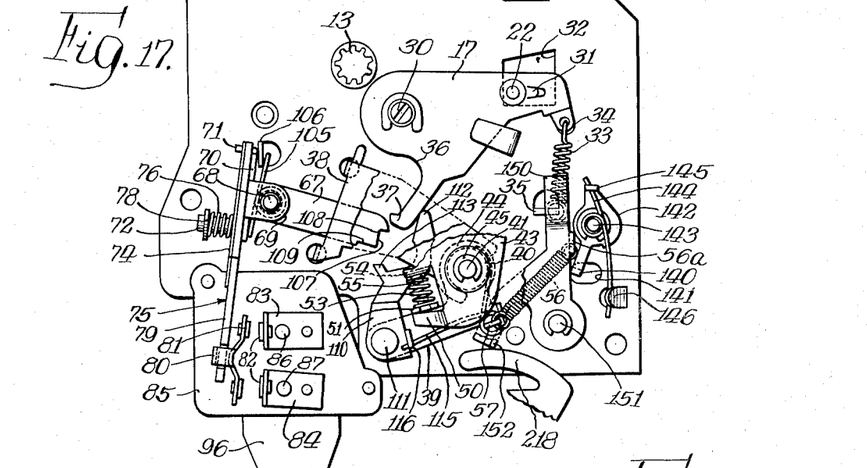
Figure 17 is a fragmentary front view of the meter mechanism, removed from its casing, showing the control and setting levers and associated parts in the positions which they occupy when the bank is locked in the casing, certain parts in front of the control and setting levers being omitted and certain other parts being broken away, for clearness of illustration.
Figure 18:
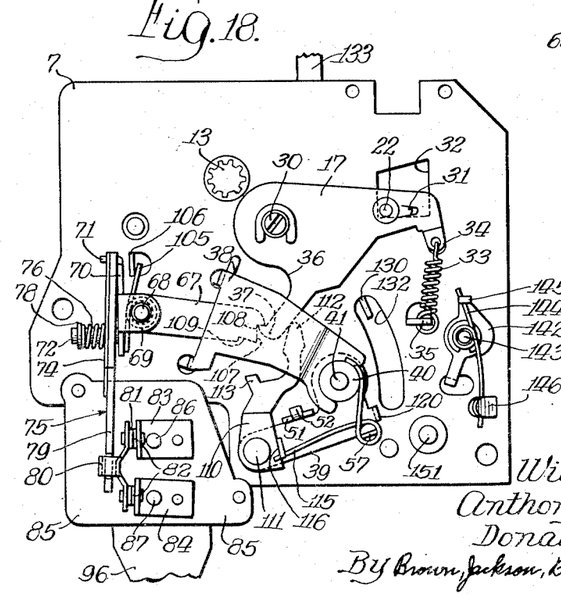
Figure 18 is a view similar to Figure 17, but with the parts in the positions which they occupy after the switch has been closed and the bank has been unlocked from the casing for removal therefrom.
Figure 19:
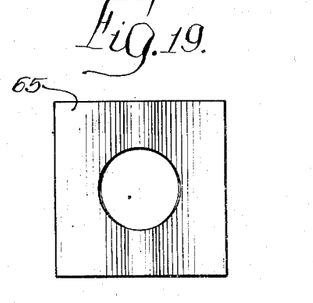
Figure 19 is a front view, on an enlarged scale, of the bowed leaf spring between the toothed setting wheel and the gear next adjacent thereto.
Figure 20:
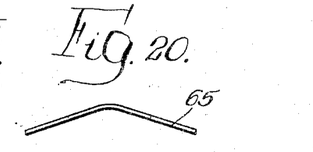
Figure 20 is an edge view of the spring of Figure 19.

In Figure 15 a key 210, which may be termed the purchaser's key, is inserted into cylinder 192. This key 210 is provided with but three tumbler actuating elements disposed to retract the first three tumblers into the cylinder 192, as shown. The cylinder 192 may then be turned clockwise, as viewed from in front—counterclockwise as viewed in Figure 12—until the two inner tumblers 206 contact the rib 189. That turns the locking plate from its full locking position, shown in full lines in Figure 12, to its first unlocking position, shown in dotted lines. The lock 180 is also adapted to be operated by a second key 211, which may be termed the dealer's key and remains in the dealer's possession. This key 211 has five tumbler engaging elements and, when fully inserted into cylinder 192, retracts all of the tumblers 206. The cylinder 192 may then be turned from its normal locked position of Figure 16 to a fully unlocked position, in which the locking plate 195 occupies its dot and dash line position indicated in Figure 12, in which pin 198 is in contact with shoulder 199 of element 196.

The locking plate 195 is aligned with a slot 214 in cover 165 of bank 160, and slot 214 is aligned with a slot 215 in arm 9a of the partition member 9. The latter slot 215 underlies finger 154 of the latch pawl 150. When the locking plate 195 is in its full locking position, shown in full lines in Figures 3 and 12, an arcuate cam finger 218 thereof extends through the slots 214 and 215 and between finger 154 and arm 9a of partition member 9. In the movement of locking plate to its full locking position, cam finger 218 first contacts finger 154 of the latch pawl 150 and swings the latter clockwise from its operative position shown in Figure 4 to its inoperative or releasing position in Figure 3, after which cam finger 218 passes beneath finger 154 and retains latch pawl 150 in its releasing position of Figure 3. That releases the setting pawl 43, which is then actuated each time a coin is inserted into the meter, for advancing the meter one space corresponding to a paid time period, as previously explained. Also, since the partition member 9 is confined between the back wall of the casing 1 of the meter and the door 2 thereof, the cam finger 218 of the locking plate 195 effectively locks the bank in position within the meter casing.

In order to remove the bank 160 from the meter, the purchaser's key 210 is inserted into lock 180 and the locking plate 195 is turned from its full locking position, shown in full lines in Figure 12, to its bank releasing position, shown in dotted lines in the latter figure. That withdraws the cam finger 218 from arm 9a of partition 9 and the bank may then be withdrawn from the meter casing 1. It will be noted, however, that in the bank releasing position of locking plate 195, the upper portion of that plate projects through slot 214 of cover 165, plate 195 being of appropriate shape and size to that end, so that when the bank is withdrawn from the meter casing the cover 165 thereof remains locked closed. Also, since plate 195 extends into the slot 215 it precludes possibility of removal of coins from the bank through that slot, removal of the coins through slot 172 being prevented by the sleeves 176, as previously explained. Accordingly, the bank when removed by the purchaser from the meter casing remains locked and unauthorized removal of coins therefrom is prevented. As previously explained, the purchaser delivers the bank to the dealer who inserts the dealer's key 211 into lock 180 and turns the locking plate 195 into its full unlocking position, shown in dot and dash lines in Figure 12, in which this plate is completely withdrawn from slot 214 of cover 165. That unlocks the bank itself permitting opening of the cover 165 and removal of the coins, which are then credited to the account of the purchaser, as has been explained. The cover 165 is then replaced and, still using the dealer's key 211, the locking plate 195 is turned to its dotted line position of Figure 12, again locking the cover 165 on the bank 160. The dealer's key 211 is then withdrawn from the lock 180 releasing the tumblers 206, the first three of which are then projected between the ribs 188 and 189 effective in cooperation therewith for locking the cylinder 192 of the lock 180 against turning movement.

When the locking plate 195 is turned from its full locking position to its bank releasing position, the cam finger 218 is withdrawn from above am 9a of the partition 9, as will be clear from what has been said. That releases the latch pawl 150 which is then moved by tension spring 56 in counterclockwise direction, into its operative or holding position shown in Figure 4. That disables the meter and prevents advancement thereof by an inserted coin, as and for the reasons above stated. The purchaser, upon return home, inserts the bank into the meter casing and locks it therein. That enables the meter which, so long as the bank 160 remains locked therein, may then be advanced by the inserted coins, as previously explained.

It will be understood that changes in detail may be resorted to without departing from the field and scope of our invention, and we intend to include all such variations, as fall within the scope of the appended claims, in this application in which the preferred form only of our invention has been disclosed.

We claim:

1. In combined meter and bank means of the character described, a casing, a switch in said casing for controlling the circuit of an associated apparatus, a coin controlled timing meter in said casing adapted for reception of a plurality of successively inserted coins, a bank in said casing receiving from said meter coins inserted thereinto, a setting member actuated responsive to insertion of coins in said meter and effective for advancing the latter a predetermined time period for each coin inserted, said meter comprising means for closing said switch responsive to insertion of a coin and holding it closed independently of said bank and for a time period corresponding to the number of coins inserted, lock means operable by two different keys effective when operated by one of said keys for locking said bank in said casing and releasing it for removal from said casing without unlocking said bank, said lock means when operated by the other of said keys being effective for unlocking said bank for removal of the coins therefrom, and means supplementary to said lock means for enabling and disabling said meter for advancement by inserted coins responsive to locking said bank in and releasing it for removal from said casing, respectively.

2. In combined meter and bank means of the character described, a casing, a switch in said casing for controlling the circuit of an associated apparatus, a coin controlled timing meter in said casing adapted for reception of a plurality of coins successively inserted therein, a setting member actuated responsive to insertion of coins in said meter and effective for advancing the latter a predetermined time period for each coin inserted, switch operating means controlled by said meter for closing said switch responsive to insertion of a coin and for maintaining it closed for a predetermined time period corresponding to the number of coins successively inserted one immediately after the other and for causing opening of said switch at the end of said time period, a bank in said casing receiving from said meter coins inserted thereinto, said switch operating means being effective for holding said switch closed independently of said bank, lock means operable by two different keys effective when operated by one of said keys for locking said bank in said casing and releasing it for removal from said casing without unlocking said bank, said lock means when operated by the other of said keys being effective for unlocking said bank for removal of the coins therefrom, and means actuated by said lock means for enabling and disabling said meter for advancement by insertion of coins responsive to locking said bank in and releasing it for removal from said casing, respectively.

3. In combined meter and bank means of the character described, a casing, a switch in said casing for controlling the circuit of an associated apparatus, a coin controlled timing meter in said casing, a setting member actuated responsive to insertion of a coin in said meter and effective for advancing the latter a predetermined time period, switch operating means for closing said switch responsive to insertion of a coin and holding it closed for the time period corresponding to the extent of advancement of said meter and for opening it at the end of the time period, a bank in said casing receiving from said meter coins inserted thereinto, said switch operating means being effective for holding said switch closed independently of said bank, lock means operable by two different keys effective when operated by one of said keys for locking said bank in said casing and releasing it for removal therefrom without unlocking said bank, said locking means when operated by the other of said keys being effective for unlocking said bank for removal of coins therefrom and locking it, and means actuated by said lock means for enabling and disabling said setting member responsive to locking said bank in and releasing it from said casing.

4. In combined meter and bank means of the character described, a casing, a switch in said casing, a coin controlled timing meter in said casing adapted for reception of a plurality of coins successively inserted therein one immediately after the other, a setting member actuated responsive to insertion of a coin in said meter and effective for advancing the latter a predetermined time period for each coin inserted, means for closing said switch responsive to insertion of a coin and maintaining it closed for the time period corresponding to the number of inserted coins and opening it at the end of such time period, a bank in said casing receiving from said meter coins inserted thereinto, a lock for said bank operable by two different keys, said lock having a locking member movable by one of said keys to a first position effective for locking said bank in said casing and a second position effective for releasing said bank from said casing for removal therefrom while maintaining said bank locked against removal of coins from it, said locking member being movable by the other of said keys from its said second position to a third position for unlocking said bank and from said third position to said second position for locking said bank, and means actuated by said locking member for enabling and disabling said setting member responsive to locking said bank in and releasing it from said casing.

5. In combined meter and bank means of the character described, a casing, a switch in said casing, a coin controlled timing meter in said casing adapted for reception of a plurality of coins successively inserted therein one immediately after the other, a setting pawl actuated responsive to insertion of a coin in said meter and effective for advancing the latter a predetermined time period for each coin inserted, means for closing said switch responsive to insertion of a coin and maintaining it closed for the time period corresponding to the number of inserted coins and opening it at the end of such time period, a bank in said casing receiving from said meter coins inserted thereinto, a lock for said bank operable by two different keys, said lock having a locking plate movable by one of said keys to a first position effective for locking said bank in said casing and a second position effective for releasing said bank from said casing for removal therefrom while maintaining said bank locked against removal of coins from it, said locking plate being movable by the other of said keys from its said second position to a third position for unlocking said bank and from said third position to said second position for locking said bank, and means actuated by said locking plate for enabling and disabling said setting pawl responsive to locking said bank in and releasing it from said casing.

6. In combined meter and bank means of the character described, a casing, a switch in said casing, a coin controlled timing meter in said casing adapted for reception of a plurality of coins successively inserted thereinto one immediately after the other, means for advancing said meter a predetermined time period for each coin inserted, means for closing said switch responsive to insertion of a coin and for maintaining it closed for a time period corresponding to the number of inserted coins and then opening it, a bank in said casing receiving from said meter coins inserted thereinto, a latch member movable to an operative position and an inoperative position respectively effective for disabling and enabling said meter advancing means, and lock means operable by two different keys and effective when operated by one of said keys for locking said bank in said casing and for releasing it for removal from said casing while maintaining said bank locked, said lock means when operated by the other of said keys being effective for unlocking said bank for removal of coins therefrom, and means controlled by said lock means for moving said latch to operative position and inoperative position responsive to locking said bank in and releasing it from said casing respectively.

7. In combined meter and bank means of the character described, a casing, a switch in said casing, the latter having therein a bank receiving compartment with a slot in one wall thereof, a coin controlled timing meter in said casing, means for closing said switch and advancing said meter a predetermined time period responsive to insertion of a coin and for opening said switch at the end of the time period corresponding to the extent of advancement of said meter, a bank in said compartment receiving from said meter coins inserted thereinto and provided with a removable cover having a slot aligned with said slot in said one wall, and a lock carried by said bank having a locking plate aligned with said cover slot, said lock being operable by two different keys, one of said keys being effective for moving said plate through both of said slots into full locking position thereby locking said bank in said casing and to a first unlocking position clear of said one wall of said compartment but extending through said cover slot, the other of said keys being effective for moving said plate to a second unlocking position clear of said cover and therefrom to said first unlocking position, and means for enabling and disabling said meter advancing means responsive to movement of said locking plate to its said full locking position and its said first unlocking position respectively.

8. In combined meter and bank means of the character described, a casing having therein a bank receiving compartment with a slot in one wall thereof, a coin controlled timing meter in said casing adapted for reception of a plurality of coins successively inserted thereinto one immediately after the other, means for advancing said meter a predetermined time period for each coin inserted, a latch member yieldingly urged toward an operative position effective for disabling said advancing means and movable therefrom to an inoperative position effective for enabling said advancing means, a bank in said compartment receiving from said meter coins inserted thereinto and provided with a removable cover having a slot aligned with said slot in said one wall, and a lock on said bank having a locking plate movable to a full locking position extending through both of said slots and effective for moving said latch member to and holding it in inoperative position, said locking plate being movable from said full locking position to a first unlocking position in which it clears said partition wall but extends through said cover slot and from said first unlocking position to a second unlocking position in which it clears said bank cover, said lock being operable by two different keys one effective for moving said plate from its full locking position to its first unlocking position and vice versa and the other key being effective for moving said plate from its first unlocking position to its second unlocking position and vice versa.

9. In combined meter and bank means of the character described, a casing having therein a bank receiving compartment with a slot in one wall thereof, a coin controlled timing meter in said casing adapted for reception of a plurality of coins successively inserted thereinto one immediately after the other, a setting member effective for advancing said meter a predetermined time period for each coin inserted, a latch pawl yieldingly urged toward an operative position in which it holds said setting member against effective operation and movable therefrom to an inoperative position in which it releases said setting member for effective operation, a bank in said compartment receiving from said meter coins inserted thereinto and provided with a removable cover having a slot aligned with said slot in said one wall, and a lock on said bank having a locking plate movable to a full locking position extending through both of said slots and effective for moving said latch pawl to and holding it in inoperative position, said locking plate being movable from said full locking position to a first unlocking position in which it clears said partition wall but extends through said cover slot and from said first unlocking position to a second unlocking position in which it clears said bank cover, said lock being operable by two different keys one effective for moving said plate from its full locking position to its first unlocking position and vice versa and the other key being effective for moving said plate from its first unlocking position to its second unlocking position and vice versa.

10. In combined meter and bank means of the character described, a casing having therein a bank receiving compartment with a slot in one wall thereof, a coin controlled timing meter in said casing comprising a rotatable toothed setting member, a setting pawl engaging and cooperating with said member for turning the latter a predetermined distance responsive to insertion of a coin and normally holding it against turning, means for actuating said setting pawl responsive to insertion of a coin, a latch pawl yieldingly urged toward an operative position rendering said setting pawl ineffective and movable to an inoperative position rendering said setting pawl effective, a bank in said compartment receiving from said meter coins inserted thereinto and provided with a removable cover having a slot aligned with said slot in said one wall, and a lock on said bank having a locking plate movable to a full locking position extending through both of said slots and effective for moving said latch pawl to and holding in inoperative position, said locking plate being movable from said full locking position to a first unlocking position in which it clears said partition wall but extends through said cover slot and from said first unlocking position to a second unlocking position in which it clears said bank cover, said lock being operable by two different keys one effective for moving said plate from its full locking position to its first unlocking position and vice versa and the other key being effective for moving said plate from its first unlocking position to its second unlocking position and vice versa.

11. In combined meter and bank means of the character described, a casing having therein a bank receiving compartment with a slot in one wall thereof, a coin controlled timing meter in said casing having a toothed setting wheel, a setting pawl engaging said wheel normally holding it against rotation and effective when actuated for advancing said wheel a predetermined extent in one direction corresponding to a paid time period, means for actuating said pawl responsive to insertion of a coin, a latch pawl yieldingly urged toward an operative position rendering said setting pawl ineffective for advancing said wheel and movable to an inoperative position rendering said setting pawl effective for advancing said wheel, a bank in said compartment receiving from said meter coins inserted thereinto and provided with a removable cover having a slot aligned with said slot in said one wall, and a lock on said bank having a locking plate movable to a full locking position extending through both of said slots and effective for moving said latch pawl to and holding in inoperative position, said locking plate being movable from said full locking position to a first unlocking position in which it clears said partition wall but extends through said cover slot and from said first unlocking position to a second unlocking position in which it clears said bank cover, said lock being operable by two different keys one effective for moving said plate from its full locking position to its first unlocking position and vice versa and the other key being effective for moving said plate from its first unlocking position to its second unlocking position and vice versa.

12. In combined meter and bank means of the character described, a casing having therein a bank receiving compartment with a slot in one wall thereof, a coin controlled timing meter in said casing, a setting pawl effective when actuated for advancing said meter a predetermined paid time period, means for actuating said pawl responsive to insertion of a coin, a latch pawl yieldingly urged toward an operative position rendering said setting pawl ineffective for advancing said meter and movable to an inoperative position rendering said setting pawl effective for advancing said meter, a bank in said compartment receiving from said meter coins inserted thereinto and provided with a removable cover having a slot aligned with said slot in one wall, and a lock on said bank having a locking plate movable to a full locking position extending through both of said slots and effective for moving said latch pawl to and holding it in inoperative position, said locking plate being movable from said full locking position to a first unlocking position in which it clears said partition wall but extends through said cover slot and from said first unlocking position to a second unlocking position in which it clears said bank cover, said lock being operable by two different keys one effective for moving said plate from its full locking position to its first unlocking position and vice versa and the other key being effective for moving said plate from its first unlocking position to its second unlocking position and vice versa.

13. In combined meter and bank means of the character described, a casing, a switch in said casing for controlling an associated apparatus, a coin controlled timing meter in said casing adapted for reception of a plurality of successively inserted coins for advancing said meter, a setting member actuated responsive to insertion of coins in said meter and effective for advancing the latter a predetermined time period for each coin inserted a bank insertible into and removable from said casing and normally positioned therein for receiving from said meter coins inserted thereinto, said meter comprising means for closing said switch responsive to insertion of a coin and holding it closed independently of said bank and for a time period corresponding to the extent of advancement of said meter, lock means including a key operated lock for locking and unlocking said bank and comprising a member movable from full locking position to full unlocking position and vice versa, and means supplementary to said lock means for enabling and disabling said meter for advancement by inserted coins responsive to movement of said lock member to full locking position and toward full unlocking position, respectively, when said bank is in its said normal position in said casing.

WILLIAM P. GALLAGHER.
ANTHONY DANIEL STOLLE.
DONALD E. SCHROEDER.

REFERENCES CITED

The following references are of record in the file of this patent:

UNITED STATES PATENTS

| Number | Name | Date |
|---|---|---|
| 901,778 | Bucknam | Oct. 20, 1908 |
| 2,015,411 | Riley | Sept. 24, 1935 |
| 2,227,181 | French | Dec. 31, 1940 |
| 2,426,649 | Shann | Sept. 2, 1947 |